US007592756B1

(12) United States Patent
Wu et al.

(10) Patent No.: US 7,592,756 B1
(45) Date of Patent: Sep. 22, 2009

(54) DRIVING CIRCUIT FOR LIGHT EMITTING DIODES

(75) Inventors: Chin-Lung Wu, Fonghua Village, Sinshih Township, Tainan County (TW); Aung Aung Yinn, Fonghua Village, Sinshih Township, Tainan County (TW)

(73) Assignee: Himax Analogic, Inc. (TW)

( * ) Notice: Subject to any disclaimer, the term of this patent is extended or adjusted under 35 U.S.C. 154(b) by 0 days.

(21) Appl. No.: 12/049,185

(22) Filed: Mar. 14, 2008

(51) Int. Cl.
H05B 37/02 (2006.01)
(52) U.S. Cl. .................. 315/307; 315/294; 315/312
(58) Field of Classification Search ............... 315/169.3, 315/189, 193, 224, 247, 291, 294, 307–308, 315/312; 345/30, 55, 76, 82, 87, 90–91; 362/800
See application file for complete search history.

(56) References Cited

U.S. PATENT DOCUMENTS

| 7,091,705 B2 * | 8/2006 | Hoshino et al. ............ 323/222 |
| 7,145,295 B1 * | 12/2006 | Lee et al. .................... 315/291 |
| 7,307,614 B2 * | 12/2007 | Vinn ............................ 345/102 |
| 2006/0139299 A1 * | 6/2006 | Tsuchiya ..................... 345/102 |
| 2008/0001547 A1 * | 1/2008 | Negru .......................... 315/189 |
| 2008/0048573 A1 * | 2/2008 | Ferentz et al. ............... 315/193 |
| 2008/0136350 A1 * | 6/2008 | Tripathi et al. .............. 315/294 |
| 2009/0058323 A1 * | 3/2009 | Yang ........................... 315/307 |
| 2009/0134817 A1 * | 5/2009 | Jurngwirth et al. .......... 315/307 |

* cited by examiner

*Primary Examiner*—David Hung Vu
*Assistant Examiner*—Tung X Le
(74) *Attorney, Agent, or Firm*—Hayes Soloway P.C.

(57) ABSTRACT

A driving circuit includes a DC-to-DC voltage converter, a current source, a detector and a feedback control circuit. The DC-to-DC voltage converter has a switch and generates a driving voltage on first ends of the series of light emitting diodes, in which a magnitude of the driving voltage is correlated with conduction of the switch. The current source is coupled to second ends of the series of the light emitting diodes and provides driving currents flowing through the light emitting diodes. The detector generates a feedback voltage corresponding to a sum of voltages on the second ends of the series of the light emitting diodes. The feedback control circuit generates a first control signal which controls the conduction of the switch in response to the feedback voltage.

10 Claims, 3 Drawing Sheets

DRIVING CIRCUIT FOR LIGHT EMITTING DIODES

BACKGROUND

1. Field of Invention

The present invention relates to a driving circuit. More particularly, the present invention relates to a light emitting diode driving circuit.

2. Description of Related Art

Recently, electronic devices with integrated display panels have become popular. For example, mobile phones, the PDA and the MP3 player all have a display panel. The display panel needs a light source, such as a backlight module, to enable the display of figures and words. The backlight module usually includes a lot of light emitting diodes that are driven by the light emitting diode driving circuit.

FIG. 1 shows the conventional light emitting diode back light module. The light emitting diode back light module includes constant voltage Vin, the resistor R1, the resistor R2, the light emitting diodes LED1, and the light emitting diodes LED2. The resistor R1 and resistor R2 are electrically connected to the light emitting diodes LED1 and LED2 respectively for limiting the current volume flowing through the light emitting diodes LED1 and LED2. The constant voltage Vin is electrically connected to the resistor R1 and resistor R2 for providing the light emitting diode LED1 and LED2 the potential.

In order to turn on the light emitting diodes LED1 (or LED2) connected serially, the constant voltage Vin needs to provide a potential greater than the sum of light emitting diodes light threshold voltages, and the luminance of the light emitting diode LED1 is corresponding to the current volume flowing through the light emitting diode LED1.

Therefore, there is a need for a new light emitting diode driving circuit which can improve the performance of the light emitting diode and the driving circuit.

SUMMARY

According to the embodiment of the present invention, a light emitting diode driving circuit is disclosed. The driving circuit includes a DC-to-DC voltage converter, a current source, a detector, and a feedback control circuit. The DC-to-DC voltage converter has a switch and generates a driving voltage on the first ends of the series of light emitting diodes, in which the magnitude of the driving voltage is correlated with the conduction of the switch. The current source is coupled to second ends of the series of the light emitting diodes and provides driving currents flowing through the light emitting diodes. The detector generates a feedback voltage corresponding to a sum of voltages on the second ends of the series of the light emitting diodes. The feedback control circuit generates a first control signal. The first control signal controls the conduction of the switch in response to the feedback voltage.

According to another embodiment of the present invention, a method includes detecting a voltage on a first end of the series of the light emitting diodes, generating a feedback voltage according to the detected voltage on the first end of the series of the light emitting diodes, generating a control signal according to the feedback voltage, and tuning a driving voltage which drives the light emitting diodes by the control signal.

It is to be understood that both the foregoing general description and the following detailed description are by examples, and are intended to provide further explanation of the invention as claimed.

BRIEF DESCRIPTION OF THE DRAWINGS

These and other features, aspects, and advantages of the present invention will become better understood with regard to the following description, appended claims, and accompanying drawings where:

DESCRIPTION OF THE PREFERRED EMBODIMENTS

Figure 1:
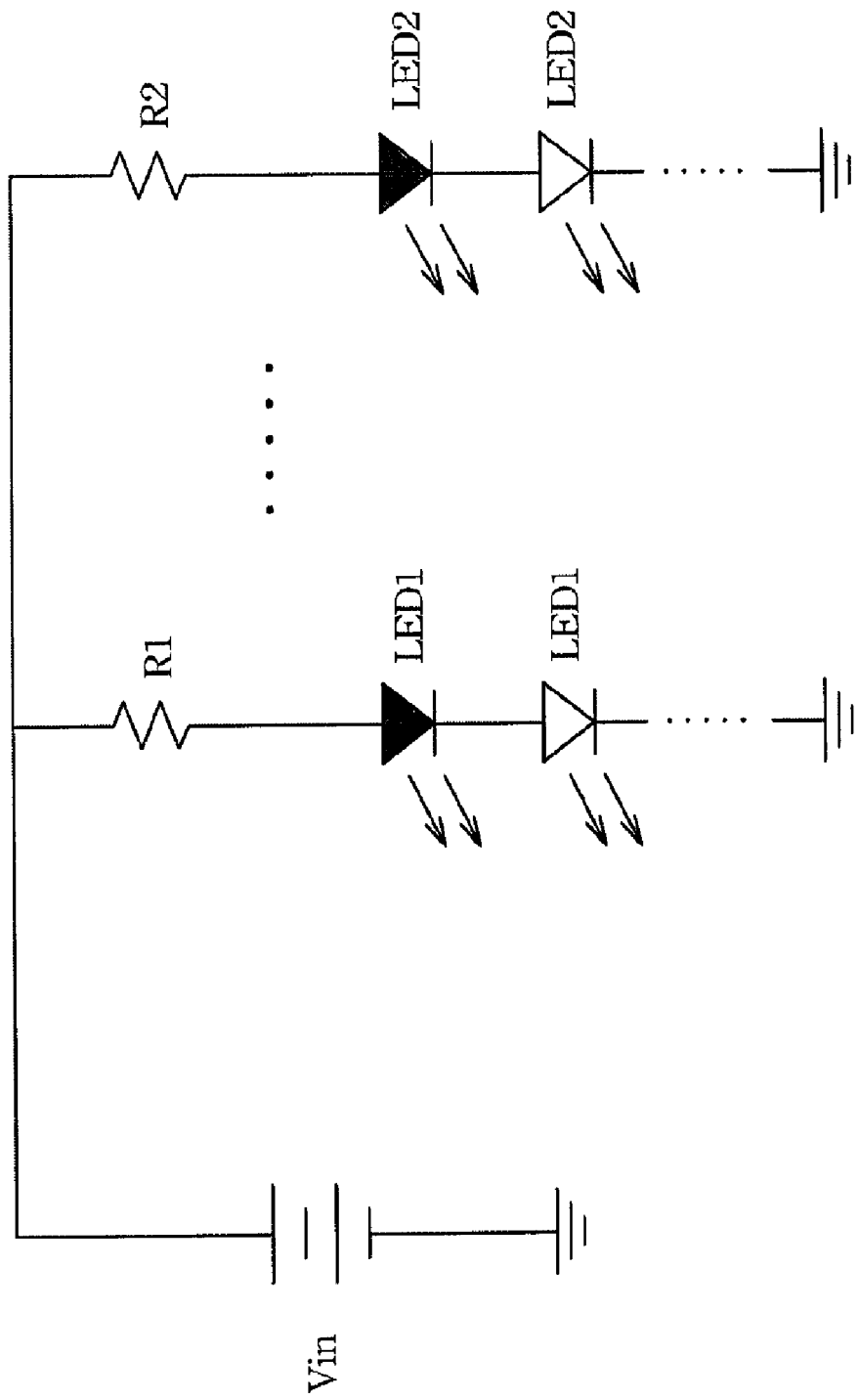
FIG. 1 shows a conventional light emitting diode driving circuit.

Reference will now be made in detail to the present preferred embodiments of the invention, examples of which are illustrated in the accompanying drawings. Wherever possible, the same reference numbers are used in the drawings and the description to refer to the same or like parts.

The light emitting diode driving circuit of the embodiments shown below uses a DC-to-DC voltage converter, a detector, and a feedback control circuit to provide a constant current for the light emitting diodes thereby improving the luminance stability of the light emitting diodes. In addition, the driving circuit can tune the driving voltage, which drives the light emitting diodes, according to the number of the light emitting diodes in series connection.

Figure 2:
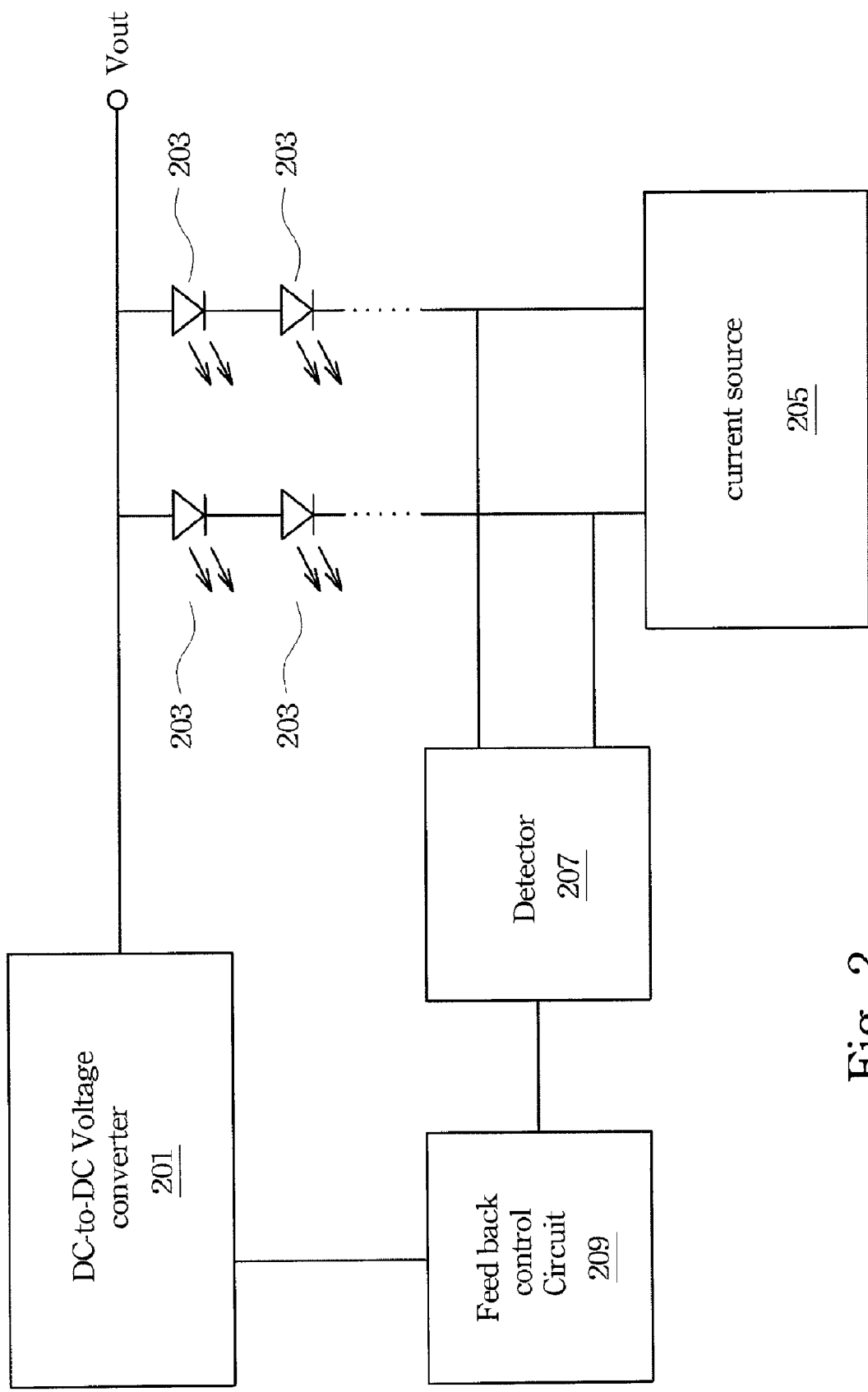
FIG. 2 shows a light emitting diode driving circuit according to one embodiment of the present invention.

FIG. 2 shows the light emitting diode driving circuit according to one embodiment of the present invention. The driving circuit, which provides the driving voltage for the light emitting diodes 203, includes the DC-to-DC voltage converter 201, the current source 205, the detector 207, and the feedback control circuit 209. The first ends of the series of light emitting diodes 203 are electrically connected to the DC-to-DC voltage converter 201, and the second ends of the series of the light emitting diodes 203 are electrically connected to the detector 207 and the current source 205.

The detector 207 detects the voltage on the second ends of the series of the light emitting diodes 203, and controls the DC-to-DC voltage converter 201 accordingly to provide the driving voltage. The current source 205 is coupled to the second ends of the series of the light emitting diodes 203 and provides driving currents flowing through the light emitting diodes 203. The detector 207 generates a feedback voltage according to the detected voltage on the end of the series of the light emitting diodes 203. The feedback control circuit 209 generates a control signal according to the feedback voltage. The DC-to-DC voltage converter 203 tunes the driving voltage which drives the light emitting diodes 203 in response to the control signal.

Figure 3:
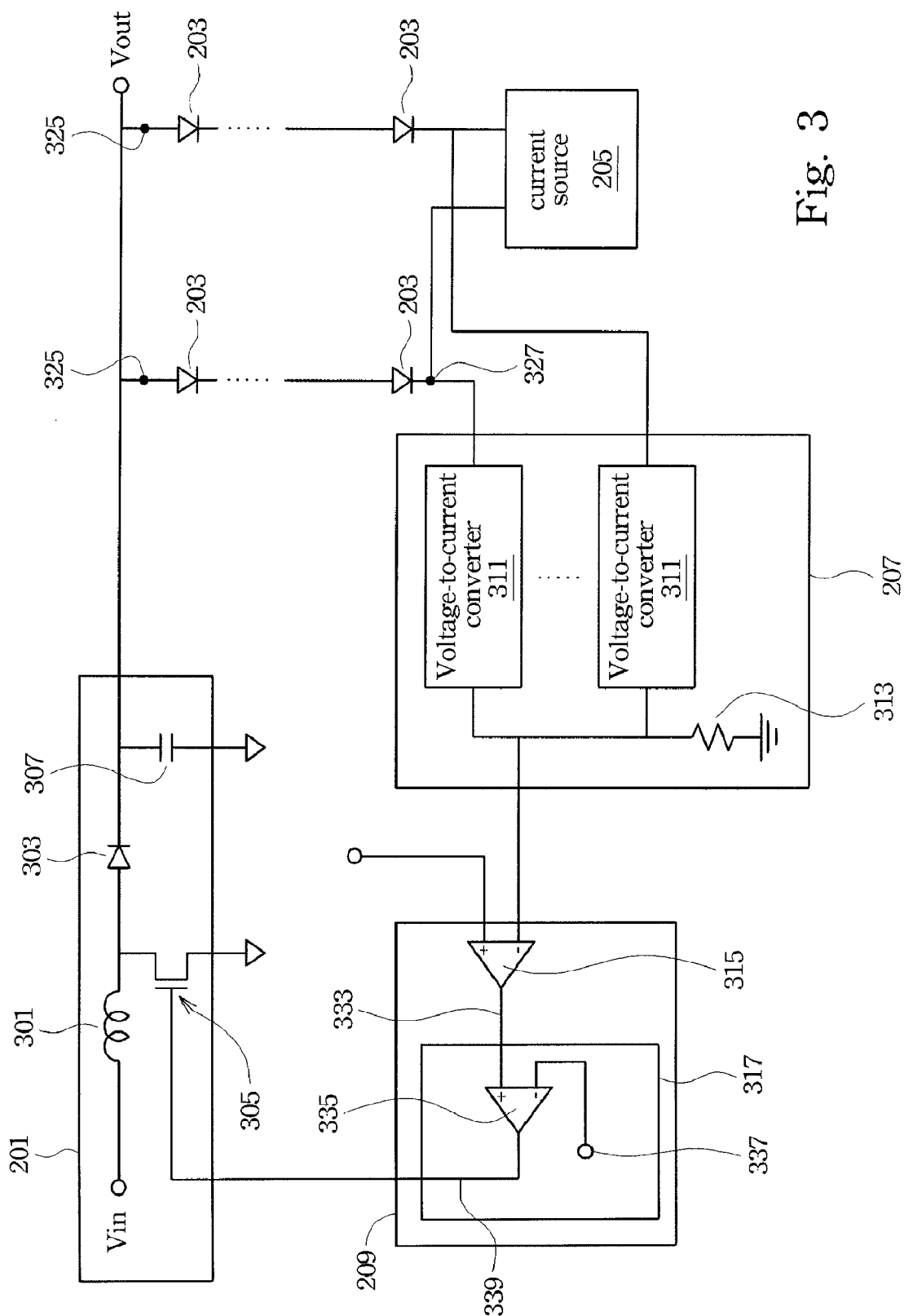
FIG. 3 shows a light emitting diode driving circuit according to another embodiment of the present invention.

FIG. 3 shows the light emitting diode driving circuit according to another embodiment of the present invention. The driving circuit includes the DC-to-DC voltage converter 201, the current source 205, the detector 207, and the feedback control circuit 209. The first ends 325 of the series of light emitting diodes 203 are electrically connected to the DC-to-DC voltage converter 201, and the second ends 327 of the series of the light emitting diodes 203 are electrically connected to the detector 207 and the current source 205.

The DC-to-DC voltage converter 201 generates a driving voltage on first ends 325 of the series of light emitting diodes 203, in which the magnitude of the driving voltage is correlated with conduction of the switch 201. The DC-to-DC voltage converter 201 includes the switch 305, the inductor 301, the diode 303, and the capacitor 307. The inductor 301 has one end receiving an input voltage, which might be a constant voltage source, and the other end coupled to the first end of the switch 305. The diode 303 has an anode coupled to the first end of the switch 305. The capacitor 307 has one end coupled to the cathode of the diode 303 and the other end receiving a ground voltage.

The driving voltage generated on the first ends 325 of the series of light emitting diodes 203 corresponds to the conducting period (the conducting time) of the switch 305. For example, if the conducting period or the conducting current of the switch 305 increase, the current stored in the inductor 301 increases as well, which raises the driving voltage. In order to provide sufficient current, the switch 305 may have an integrated power MOS to provide a large current.

The detector 207, electrically connected to the light emitting diodes 203, includes several voltage-to-current converters 311, each of which generates a feedback current corresponding to the detected voltage on the second ends 327 of the series of the light emitting diodes 203. The detector 207 further includes the resistor 313. The feedback current flows through the resistor 313, such that the feedback voltage is generated on one end of the resistor 313 (The other end of the resistor 313 is grounded).

The feedback control circuit 209 is electrically connected between the detector 207 and the DC-to-DC voltage converter 201. A first comparator 315 on the feedback control circuit 209 generates a second control signal to control the conduction of the switch 305. The first comparator 315 generates the second control signal by comparing the feedback voltage, received on the negative terminal of the first comparator 315, and a constant voltage that is usually less than 1.2v. As a result, the duty period of the second control signal is inversely proportional to the magnitude of the detected voltage on the second ends of the series of the light emitting diodes 203. In other words, if the detected voltage on the second ends of the series of the light emitting diodes 203 raises, the feedback voltage on one end of the resistor 313 raised as well, the duty period of the second control signal and the conducting period of the switch 305 decrease thereby decreasing the driving voltage Vout.

The feedback control circuit 209 might further include a second comparator 335. The second comparator 335 generates the first control signal by comparing the second control signal (received from the positive terminal of the second comparator 335) and a reference voltage (received from the negative terminal of the second comparator 335) that may be a triangular wave signal. With the second comparator 335, the conducting period of the switch 305 can be further tuned as required, and the driving voltage can be drawn to the required voltage more accurately.

According to the above embodiments, the light emitting diode driving circuit can provide a required current for the light emitting diodes, which improves the luminance stability of the light emitting diodes. In addition, the driving circuit can generate the driving voltage according to the number of the light emitting diodes in series connection, which reduces the unnecessary power consumption.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A driving circuit for a plurality of series of light emitting diodes, comprising:
    a DC-to-DC voltage converter having a switch and generating a driving voltage on first ends of the series of light emitting diodes, wherein a magnitude of the driving voltage is correlated with conduction of the switch;
    a current source coupled to second ends of the series of the light emitting diodes and providing driving current flowing through the light emitting diodes;
    a detector generating a feedback voltage corresponding to a sum of voltages on the second ends of the series of the light emitting diodes, wherein the detector comprises:
        a plurality of voltage-to-current converters, each generating a feedback current corresponding to a voltage on one of the second ends of the series of the light emitting diodes; and
        a resistor through which all the feedback current flows such that the feedback voltage is generated on one end of the resistor; and
    a feedback control circuit generating a first control signal which controls the conduction of the switch in response to the feedback voltage.

2. The driving circuit as claimed in claim 1, wherein the DC-to-DC voltage converter further comprises:
    an inductor having one end receiving an input voltage and the other end coupled to a first end of the switch;
    a diode having an anode coupled to the first end of the switch; and
    a capacitor having one end coupled to a cathode of the diode and the other end receiving a ground voltage.

3. The driving circuit as claimed in claim 1, wherein the feedback control circuit comprises a first comparator generating a second control signal for controlling the conduction of the switch, wherein the second control signal is generated by comparing the feedback voltage and a constant voltage.

4. The driving circuit as claimed in claim 3, wherein the feedback control circuit further comprises a second comparator generating the first control signal by comparing the second control signal and a reference voltage.

5. The driving circuit as claimed in claim 4, wherein the reference voltage is a triangular wave signal.

6. The driving circuit as claimed in claim 1, wherein the switch is implemented by a power MOS transistor.

7. A method for driving a series of light emitting diodes, comprising:
    detecting a voltage on a second end of the series of the light emitting diodes;
    generating a feedback voltage according to the detected voltage on the second end of the series of the light emitting diodes, wherein the feedback voltage is generated by generating a feedback current corresponding to the detected voltage on one of the second ends of the series of the light emitting diodes, then flowing the feedback current through a resistor, such that the feedback voltage is generated on one end of the resistor;
    generating a control signal according to the feedback voltage; and
    tuning a driving voltage which drives the light emitting diodes by the control signal.

8. The method as claimed in claim 7, wherein the feedback voltage increases as the detected voltage increases.

9. The method as claimed in claim 7, wherein the control signal is generated by comparing the feedback voltage and a reference signal, and the duty period of the control signal decreases as the feedback voltage increases.

10. The method as claimed in claim 7, wherein the driving voltage is decreased as the duty period of the control signal decreases.

* * * * *